Dec. 18, 1962 R. CARMICHAEL ETAL 3,069,489
CONTAINER CLOSURE
Filed Nov. 19, 1958

INVENTORS
ROBERT CARMICHAEL
FRANK G. SPANUR
GODFREY H. KLUN

BY
ATTORNEY

United States Patent Office 3,069,489
Patented Dec. 18, 1962

3,069,489
CONTAINER CLOSURE
Robert Carmichael, Lakewood, and Frank G. Spanur and Godfrey H. Klun, Cleveland, Ohio, assignors to Union Carbide Corporation, a corporation of New York
Filed Nov. 19, 1958, Ser. No. 774,931
8 Claims. (Cl. 136—133)

This invention relates to a closure for a cylindrical container having at least one open end, and more particularly, the invention relates to a seal closure for a galvanic cell, especially the type employing an alkaline electrolyte.

An alkaline cell is known to be one of the most difficult cells to seal against electrolyte leakage. The electrolyte of such a cell is caustic, a characteristic of which is that the electrolyte has a tendency to "creep," that is, to wet the surface of a seal closure and, through what might be termed a "capillary action," exude through the seal of a cell. For example, a nickel-cadmium rechargeable cell employing a caustic electrolyte will ordinarily leak electrolyte quite readily if not properly sealed. Leakage of caustic electrolyte to the outside of a cell is not only disadvantageous because it diminishes the supply of electrolyte within the cell, but is also dangerous if the cell is to be handled.

In the art, extensive work has been directed towards the solution of the electrolyte leakage problem, but despite the complex and expensive lengths to which manufacturers have gone, improvements resulting therefrom have been of doubtful value.

The principal object of the invention is to provide sealing means which will prevent electrolyte leakage from a galvanic cell, and particularly from an alkaline galvanic cell.

Another important object is to provide a seal closure that is used in effectuating the leak-proof sealing of a galvanic cell.

A concurrent object of the invention is to provide a seal closure for any cylindrical container which will prevent leakage of a material contained therein.

The invention comprises a novel seal closure which has been "radially sealed" in a proper position within a cylindrical container.

Figure 1:
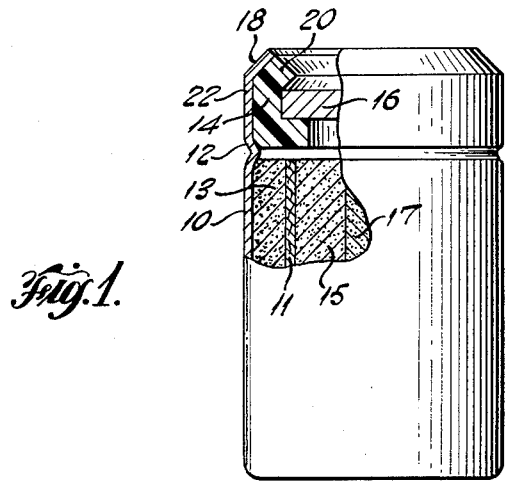
Figure 2:
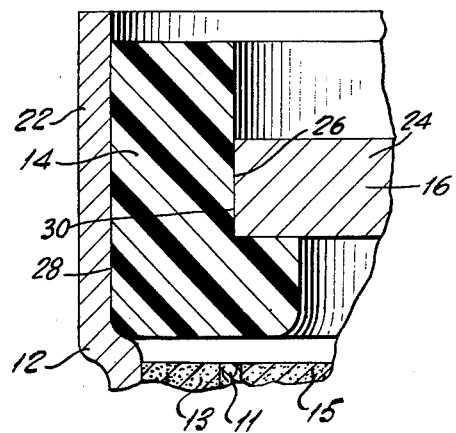
Figure 3:
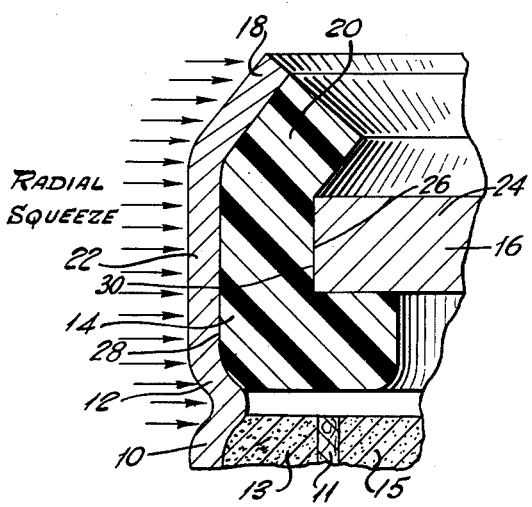

So that the invention may be more readily understood and for purposes of illustration, a seal closure embodying the principles of the invention is shown in the accompanying drawings wherein:

FIG. 1 is a partially sectioned elevation of galvanic cell showing the elements of the cell after the seal assembly has been radially compressed according to the principles of the invention; and FIG. 2 is a fragmentary sectional view of the cell of FIG. 1 showing the seal assembly in position in the cell prior to being radially compressed; and FIG. 3 is similar to FIG. 2 and shows the seal assembly after it has been radially compressed.

Broadly stated, the principal object of the invention is accomplished by providing a seal closure for a galvanic cell comprising a cupped metallic container having therein the electrolyte containing active materials and a separator. The seal closure comprises an annular gasket of a hard, di-electric, plastic-like material which is resistant to cold-flow and a metallic container cover, the gasket being interposed between the container wall and the edge of the cell cover in supporting relation with the cell cover. The actual sealing is effected by radially compressing the gasket between the container and the cell cover under a high radial force. After the compressive force is removed from the container, the gasket will exert a radial compressive force outwardly against the container which is substantially equivalent to, but not greater than, the yield strength of the metal of which the container is made.

The term "cold-flow," as used herein and in the appended claims, refers to the gradual deformation of a material that occurs when that material is subjected to a constant load at room temperature. Materials which deform very little or only when large forces are applied and which do not continue to deform or creep when the force is applied for a considerable length of time are said to have good cold-flow characteristics. The cold-flow is in a direction generally perpendicular to the applied load and limits the use of a material having poor cold-flow properties as a seal gasket, since the force or stress applied to affect a good seal can never exceed that stress at which the material will distort, unless, of course, distortion of the material is in some way restrained.

The invention contemplates the use of a seal gasket made from material which will not be attacked by the corrosive electrolyte of the cell and which has good di-electric properties as well; the gasket serving to insulate the positively and negatively charged parts of the cell, but, equally as important, the material must be one generally characterized by its high compressive and shear strength and one capable of withstanding large stresses without a tendency to cold-flow.

Nylon, a polymer of hexamethylene diammonium adipate, is a hard plastic composition that has been found to be a suitable material for use in the practice of the invention. A nylon plastic sold under the trade mark "Zytel" is the preferred material.

Table I below lists various physical properties of "Zytel" nylon that is commercially available and which is suitable for use in the practice of the invention.

In the table, the term "creep in flexure" is a measure of deformation under a prolonged standard load, the values stated representing mils of deflection in 24 hours of a 1/8 inch by 1/2 inch bar, 4 inches in length, center-loaded flatwise to 1000 pounds per square inch, minus the initial deflection.

TABLE I

Properties of "Zytel Nylon"

[All properties measured at 73° F.]

| Property: | Units (Range) |
|---|---|
| Tensile strength_____lbs. per sq. in.___ | 5,000– 10,500 |
| Modulus of elasticity_____do____ | 38,000– 40,000 |
| Shear strength _____do____ | 2,500– 9,600 |
| Stiffness _____do____ | 19,800–200,000 |
| Compressive stress at 1% deformation_____do____ | 800– 4,900 |
| Creep in flexure_____mils___ | 90– 120 |
| Hardness (Rockwell hardness number)_ | 45– 118 |

The tightest seal that may be effected between the container and the cover of the cell, is a seal wherein the force or stress exerted by the seal gasket lies in a plane parallel to the cell cover and perpendicular to the walls of the container, or simply stated, wherein the seal gasket of the closure is compressed radially between the cell cover and the container.

As stated above, to accomplish such a seal it is necessary that the material used for the seal gasket be a material characterized by its high compressive and shear strength and therefore the seal of the invention could not be accomplished by using a soft plastic material, such as soft polyethylene, which deforms readily under stress, although a hard polyethylene might possibly be used, and which is the material generally used for seal gaskets in the prior art. While it is true that a soft plastic seal gasket can be compressed to a maximum stress, the seal gasket would be stress relieved by cold-flow, and thus the tightness of the seal would be diminished when the soft palstic gasket distorts.

The actual radial sealing of the cell may be accomplished in a number of ways, a typical way being by pushing or forcing the container with the gasket and cover in place through a die so that the container is drawn down and around the cover and gasket, thereby exerting the maximum seal force or stress upon the seal closure. This process of altering the dimensions of a cylinder by utilizing pressure to pull or force a cylinder into a desired shape is known as drawing and the die used to accomplish the change is referred to as a draw die. The metal container, due to the drawing operation is normally permanently shaped and there is very little if any spring back of the container after passing through the draw die. However, the container wall is actually forced outward by the strain in the gasket and thereby the tightest possible seal is accomplished.

To illustrate the effectiveness of the seal, two metal containers, one 1¼ inches and the other ½ inch in diameter and having a wall thickness of 0.01 inch, were sealed in accordance with the principles of the invention. The pressure in the containers was then allowed to build up continuously and endwise motion of the covers was prevented. The larger container burst at a pressure of about 800 pounds per square inch, and the smaller container at a pressure of about 1800 pounds per square inch. Moreover, both of the containers blew out their bottom walls in the test; the seal closure remaining fully intact.

The use of a cell container which retains such tremendous pressure is ordinarily impractical and dangerous in a commercial galvanic cell because of the danger of the cell gassing and exploding through accidental causes.

However, the seal closure of the invention has inherent in its construction a unique feature which permits the control of the maximum pressure it will withstand, without any sacrifice in seal tightness. As stated above, the seal of the invention is accomplished by radially compressing a suitable nylon gasket and this being the only stress on the seal closure, it is possible for endwise motion of the cover and seal gasket to take place under a relatively small force applied to the cover. This permissible endwise motion is similar to the motion of a ringed piston in a cylinder. A safety blow-out seal, should the cell pressure become excessive, is thus made possible by crimping the container over the seal assembly. In the event an unsafe pressure is reached within the cell, this crimped seal will fail in part and vent the cell without blowing out the cell cover.

Referring now to the drawings, and in particular to FIGS. 1 and 2, the upper portion 22 of a metal container 10 is stepped at 12 to a diameter slightly larger than the body of the container 10, to keep the seal closure from being pushed into the cell; a step of between 0.01 and 0.02 inch being suitable. The separator 11, the electrolyte containing negative material 13 and positive material 15, and the positive collector 17, the container 10 acting as the negative collector, are then properly positioned within the cell. An annular gasket 14 is inserted within the cell and rests on step 12, it being understood that the gasket material is of a suitable type as outlined above, and that it is generally L shaped but the particular shape employed should be the one best suited for the proper sealing of the particular cell. The metal cover 16 is placed within the cell and supported by the gasket 14.

Referring now in particular to FIG. 3, the top edge 18 of the container 10 and the top edge 20 of the seal 14 has been crimped to hold the cover 16 within the cell and the seal closure has been compressed radially.

As shown more clearly in FIGS. 2 and 3, the cover 16 has a substantial horizontally disposed portion 24 which terminates at the periphery of the cover 16 in a vertical edge 26. When the cover 16 and the gasket 14 are in place prior to sealing, a vertical section of the cylindrical container 10 and the vertical edge 26 of the cover 16 are in juxtaposition with outer and inner vertical sections 28 and 30 respectively of the gasket 14.

During radial compression of the seal closure, the diameter of the enlarged portion of the container 22 is drawn inwardly to the diameter of the cell container 10. The initial width or gauge of the seal gasket 14 chosen is such that after assembly of the sealed cell is complete and the gasket 14 has been radially compressed, the thickness of the seal gasket 14 will have been reduced by about 25 percent of its original thickness.

To test the effectiveness of the invention an alkaline cell was sealed as follows:

A drawn steel container, .010 inch thick, was stepped at its upper end to a diameter of .020 inch above that of the main body of the container. The step was used to position the cover and gasket after insertion of the necessary cell elements and completion of internal connections. The container was supported in a sleeve, on the step, and the top edge was crimped inward a predetermined amount. The entire unit was then pushed up through a 5° draw die which brought the upper end diameter of the container down to that of the main body of the container, but left the step in the container for permanent cover support. The stamped steel cover was made of .040 inch thick plate stock. The gasket material was "Zytel" having the suitable properties outlined above, and was originally .040 inch thick at the edge of the cover, and was compressed to .030 inch during drawing.

This particular cell was found to operate satisfactorily under several months continuous cycling and overcharge without any evidence of any electrolyte leakage.

While the above discussion is directed generally to the sealing of galvanic cells, it is readily apparent that the principles of the invention may be applied with similar success to effectuate an excellent leak proof seal of any cylindrical container. For example, the seal closure of the invtntion would be excellent for sealing condensers and other similar electrical equipment.

What is claimed is:

1. A seal closure for sealing a cylindrical container, the sidewall of which is made of a rigid metal and having originally at least one open end; said closure comprising a cover made of a rigid metal and an annular gasket of a hard plastic-like material; said cover having a substantial horizontally disposed portion which terminates at the periphery of said cover in a vertical edge; said annular gasket of hard plastic-like material being characterized by a resistance to cold-flow and a high compressive and shear strength and having an inner vertical section which corresponds to said vertical edge of said cover and an outer vertical section which corresponds to a section of said sidewall of said cylindrical container; said gasket being interposed between said cover and the inner side wall of said cupped container with its vertical portions in juxtaposition with the corresponding vertical portions of said container sidewall and said cover; said gasket being in a state of radial compression between said cover and said container sidewall and exerting a force which is normal to said vertical portions of said container sidewall, cover, and gasket, and parallel to said substantial horizontally disposed portion of said cover; said force being substantially equivalent to, but not greater than the yield strength of the rigid metal of which said sidewall of said container is formed.

2. A seal closure for sealing a galvanic cell against electrolyte leakage, said galvanic cell comprising a cupped metallic container made of a rigid metal and having an electrolyte therein; said closure comprising a cover made of a rigid metal and an annular gasket of a hard di-electric nylon plastic; said cover having a substantial horizontally disposed portion which terminates at the periphery of said cover in a vertical edge; said annular gasket of hard nylon being characterized by a resistance to cold-flow and a high compressive and shear strength and having an inner vertical section which corresponds to said vertical edge of said cover and an outer vertical section which corresponds to a section of said cupped cylindrical container; said gasket being interposed between said cover and the inner sidewall of said cupped container with its vertical portions in juxtaposition with the corresponding vertical portions of said container sidewall and said cover; said gasket being in a state of radial compression between said cover and said container sidewall and exerting a force which is normal to said vertical portions of said container sidewall, cover, and gasket, and parallel to said substantial horizontally disposed portion of said cover; said force being substantially equivalent to, but not greater than the yield strength of the rigid metal of which said cupped container is formed.

3. A sealed cylindrical container, the sidewall of which is made of a rigid metal and having originally at least one open end; said container being sealed by a seal closure which comprises a cover made of a rigid metal and an annular gasket of a hard plastic-like material; said cover having a substantial horizontally disposed portion which terminates at the periphery of said cover in a vertical edge; said annular gasket of a hard plastic-like material being characterized by a resistance to cold-flow and a high compressive and shear strength and having an inner vertical section which corresponds to said vertical edge of said cover and an outer vertical section which corresponds to a section of said sidewall of said cylindrical container; said gasket being interposed between said cover and the inner sidewall of said container with its vertical portions in juxtaposition with the corresponding vertical portions of said container sidewall and said cover; said gasket being in a state of radial compression between said cover and said container sidewall and exerting a force which is normal to said vertical portions of said container sidewall, cover, and gasket, and parallel to said substantial horizontally disposed portion of said cover; said force being substantially equivalent to, but not greater than the yield strength of the rigid metal of which said sidewall of said container is formed.

4. A sealed galvanic cell comprising a cupped metallic container made of a rigid metal and having an electrolyte therein; said cell being sealed at the open end of said cupped container by a seal closure which comprises a cover made of a rigid metal and an annular gasket of a hard di-electric plastic-like material; said cover having a substantial horizontally disposed portion which terminates at the periphery of said cover in a vertical edge; said annular gasket of a hard plastic-like material being characterized by a resistance to cold-flow and a high compressive and shear strength and having an inner vertical section which corresponds to said vertical edge of said cover and an outer vertical section which corresponds to a section of said cupped cylindrical container; said gasket being interposed between said cover and the inner sidewall of said cupped container with its vertical portions in juxtaposition with the corresponding vertical portions of said container sidewall and said cover; said gasket being in a state of radial compression between said cover and said container sidewall and exerting a force which is normal to said vertical portions of said container sidewall, cover, and gasket, and parallel to said substantial horizontally disposed portion of said cover; said force being substantially equivalent to, but not greater than the yield strength of the rigid metal of which said cupped container is formed.

5. The sealed galvanic cell of claim 4 wherein said annular gasket is made of a hard nylon plastic.

6. The sealed galvanic cell of claim 5 wherein said annular gasket is generally L shaped.

7. A method of preventing electrolyte leakage from a galvanic cell; said cell comprising a cupped metallic container made of a rigid metal, a cover made of a rigid metal and having a substantial horizontally disposed portion which terminates at the periphery of said cover in a vertical edge, and an electrolyte therein; said method comprising interposing between the sidewall of said container and said vertical edge of said cover and in supporting relation with said cover, an annular generally L shaped gasket of a hard di-electric plastic-like material which is resistant to cold-flow and has a high compressive and shear strength and has an inner vertical section which corresponds to said vertical edge of said cover and an outer vertical section which corresponds to a section of said cupped cylindrical container; and radially compressing said gasket between said container wall and said vertical edge of said cover under a high radial force which is normal to said vertical portions of said container sidewall, cover, and gasket, and parallel to said substantial horizontally disposed portion of said cover; said radial compression being effected by forcing said container with said gasket and said cover in place through a draw die so that said container is drawn in around said cell cover and said gasket in compressive stress.

8. A method of preventing electrolyte leakage from a galvanic cell; said cell comprising a cupped metallic container made of a rigid metal and being stepped at its open end to a diameter of about .020 inch above that of the main body of said container, a cover made of a rigid metal and having a substantial horizontally disposed portion which terminates at the periphery of said cover in a vertical edge, and an electrolyte therein; said method comprising interposing between the sidewall of said container and said vertical edge of said cover and in supporting relation with said cover, an annular generally L shaped gasket of a hard nylon plastic which is resistant to cold-flow and has a high compressive and shear strength and has an inner vertical section which corresponds to said vertical edge of said cover and an outer vertical section which corresponds to a section of said cupped cylindrical container; said gasket having such a thickness that when said gasket is radially compressed its thickness will be reduced by about one-quarter; said step positioning said cover and said gasket; said container having its open end crimped inward a predetermined amount; and radially compressing said gasket between said container wall and said vertical edge of said cover under a high radial force which is normal to said vertical portions of said container sidewall, cover, and gasket, and parallel to said substantial horizontally disposed portion of said cover; said radial compression being effected by forcing said container with said gasket and said cover positioned in place by said step through a draw die which will reduce said upper end diameter of said container to that of said main body of said container while leaving said step in said container for permanent support of said cover and said gasket.

References Cited in the file of this patent

UNITED STATES PATENTS

| 2,495,247 | Friedman | Jan. 24, 1950 |
| 2,636,062 | Colton | Apr. 21, 1953 |
| 2,665,329 | Brennan | Jan. 5, 1954 |
| 2,712,565 | Williams | July 5, 1955 |
| 2,843,650 | Jacquier | July 15, 1958 |

OTHER REFERENCES

"A Dictionary of Metallography" (Rolfe), published by Chapman and Hall (London), 1949, pages 80 and 285 are relied on.

"Principles of High-Polymer Theory and Practice" (Schmidt et al.), published by McGraw-Hill (New York), 1948, pages 270 and 513 are relied on.